March 19, 1957 W. J. DAVIS 2,785,740
TIRE BEAD BREAKING HAND TOOL
Filed March 18, 1953 3 Sheets-Sheet 1
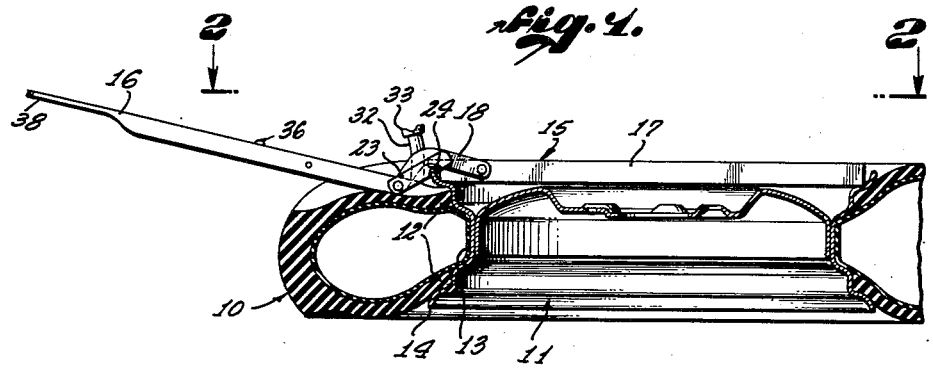
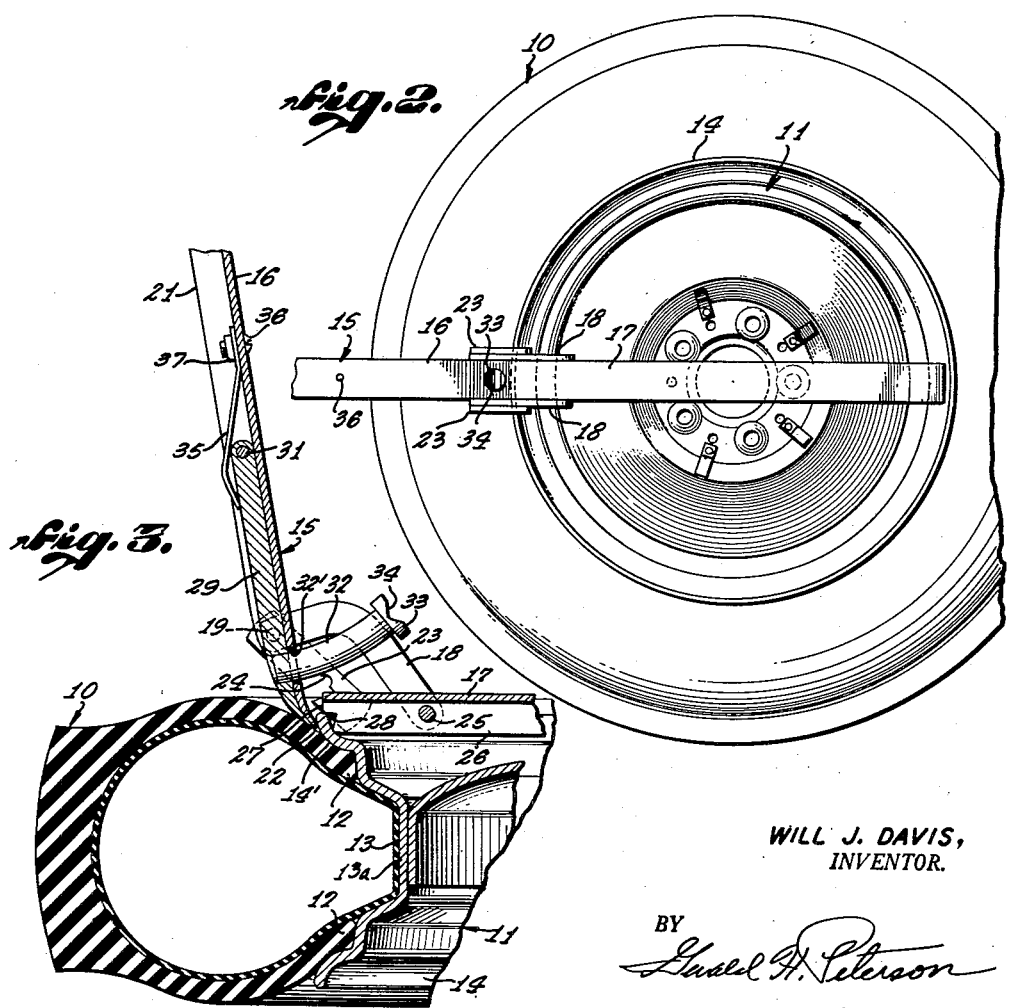
WILL J. DAVIS,
INVENTOR.
BY
ATTORNEY.

March 19, 1957 W. J. DAVIS 2,785,740
TIRE BEAD BREAKING HAND TOOL
Filed March 18, 1953 3 Sheets-Sheet 2
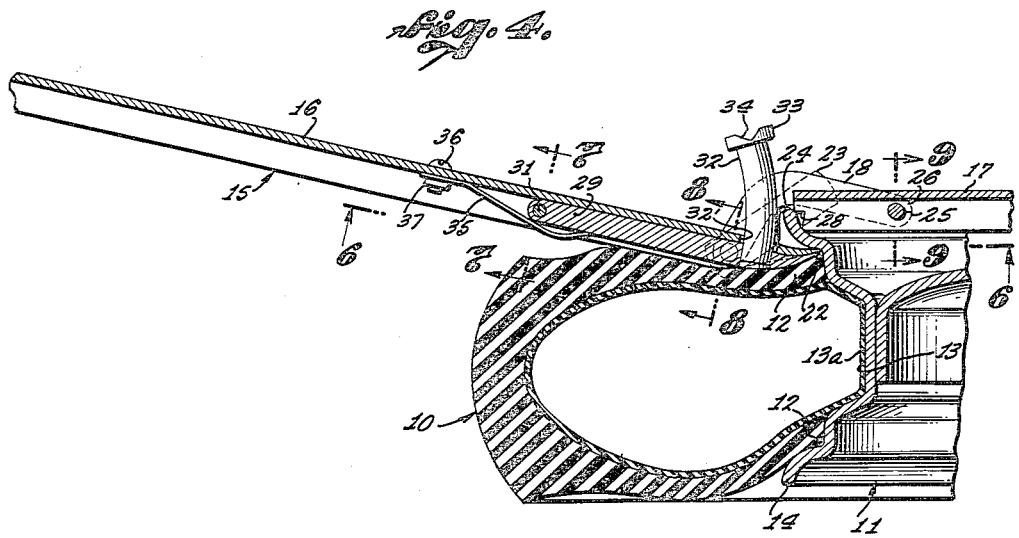
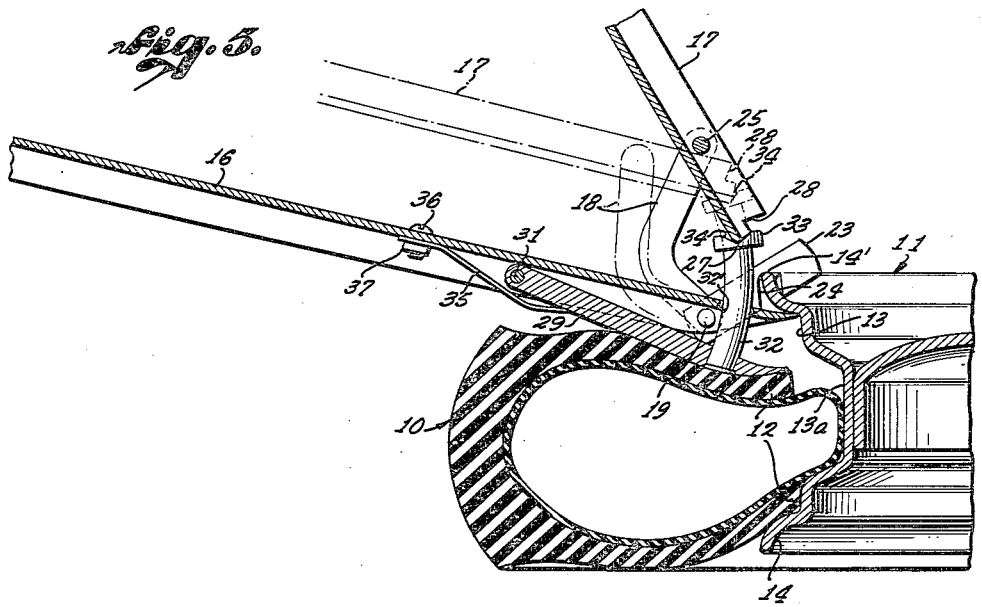
WILL J. DAVIS,
INVENTOR.
BY
ATTORNEY.

March 19, 1957 W. J. DAVIS 2,785,740
TIRE BEAD BREAKING HAND TOOL
Filed March 18, 1953 3 Sheets-Sheet 3
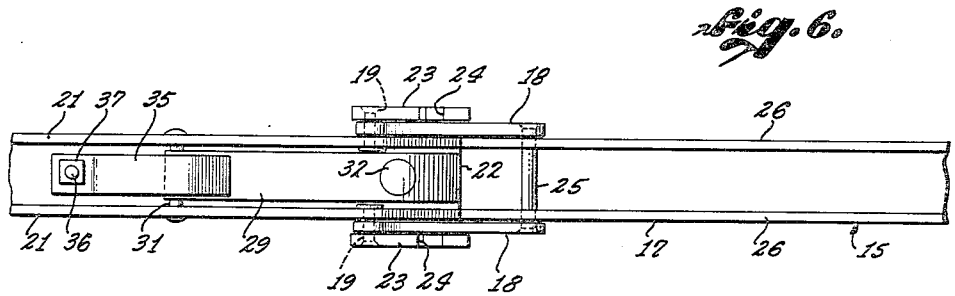
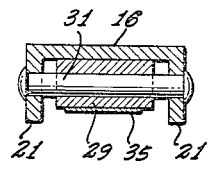 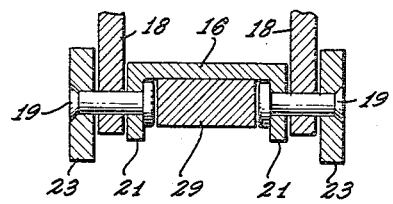
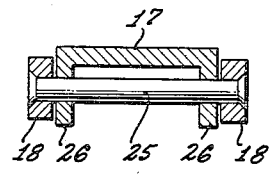
WILL J. DAVIS,
INVENTOR.
BY
ATTORNEY.

United States Patent Office 2,785,740
Patented Mar. 19, 1957

2,785,740

TIRE BEAD BREAKING HAND TOOL

Will J. Davis, Santa Monica, Calif.

Application March 18, 1953, Serial No. 345,371

1 Claim. (Cl. 157—1.17)

My invention relates to a tool, and more particularly to a tire tool for breaking loose the bead of tire from the rim of an automobile wheel.

After a pneumatic tire has been in use for a period of time, the beads of the tire become tightly adhered to the rim periphery. The expansion of the tire under pressure and the heat created during use combine to wedge and secure the bead in its complementary groove, in such tight adherence that a great force is required to loosen the tire from the rim, when it becomes necessary to remove the tire from the rim to replace or repair it.

For lack of a proper instrument to dislodge the bead, it has generally been the practice to hammer the tire at the region of the bead with a blunt instrument such as a mallet. This practice is difficult at best and not very effective and also very often injures the inner periphery of the tire, or weakens the tire by injuring the casing threads. Also, such a method often results in an injured rim periphery, removing paint therefrom and scratching the metal with resultant corrosion.

The only instruments available to loosen the tire bead are large, cumbersome and costly and are too large to be stored in the available storage space of a vehicle and therefore cannot be carried in the vehicle for emergency use. Also the cost is generally beyond the means of the average motorist. Of the tools that are available for the purpose, there are none of which I am aware which perform the desired action of providing force at the bead itself which is a very strong part of the tire. The force of these tools is applied to the region near the bead which is not as strong as the bead itself. When the tire is mounted on the rim, the bead of the tire is necessarily confined within the groove of the rim and the outer peripheral flanges of the rim conceal or overlap the beads, making it difficult to reach the bead and apply force to the bead itself to loosen it.

It is therefore the principal object of this invention to provide a tool to loosen the bead of tire from the rim of a wheel by applying a force directly to the bead of the tire.

It is an object of this invention to provide a tool that is readily operable by the operator without elaborate adjustments or assembly.

A further object of this invention is to provide a tool to loosen the bead of the tire from the rim of a wheel that is compactly foldable for storage.

An important object of this invention is to provide a tool to loosen the bead of a tire from the rim of a wheel without marring or injuring the rim of the wheel, or the walls of the tire.

Another object of this invention in one of its forms is to provide a tool that loosens the bead from the rim without removing the wheel from the vehicle.

Other important objects and advantages of my invention will be apparent from the following specification and accompanying drawings wherein:

Fig. 1 is a sectional view of a tire and wheel wherein there is shown a bead loosening tool applied to the rim of the wheel and in position to apply force to the bead of the tire.

Fig. 2 is a plan view in elevation as seen on line 2—2 of Fig. 1.

Fig. 3 is an enlarged fragmentary sectional view of a tire and rim with a bead loosening tool of my invention in its primary position.

Fig. 4 is a sectional view similar to Fig. 3, showing the bead loosening tool according to my invention in a secondary position corresponding to that of Fig. 1.

Fig. 5 is a sectional view similar to Fig. 3 showing the ultimate position of the bead loosening tool.

Fig. 6 is a bottom plan view as seen substantially on line 6—6 of Fig. 4 omitting the tire and wheel.

Fig. 7 is a vertical sectional view as taken on line 7—7 of Fig. 4.

Fig. 8 is a vertical sectional view as taken on line 8—8 of Fig. 4.

Fig. 9 is a vertical sectional view as taken on line 9—9 of Fig. 4.

Referring to the drawings wherein there is shown a pneumatic tire 10 mounted on a wheel 11 with beads 12 mounted within the groove 13 of the rim 14. Generally referred to at 15 is a bead loosening tool according to my invention in which the embodiment shown is formed of a pair of channel-shaped arms 16, 17 joined by a pair of parallel links 18. The links 18 are pivotally mounted as by a pair of stub shafts or pins 19 (Fig. 6 and Fig. 8) to the depending flanges 21 of the member 16 and spaced from the projecting end 22 thereof. Also mounted on the stub shafts 19 are a pair of notched arms or hooks 23, notched as at 24. The opposite ends of the links 18 are mounted pivotally as by a pivot pin 25 to the depending flanges 26 of the member 17, and spaced from the projecting end 27 thereof. The flanges 26 are notched at the end 27 as at 28 to receive the rim flange 14'. These notches 28 provide a means whereby the projecting end 27 of member 17 extending from pivot 25 to the notches 28 in contact with the rim flange 14' holds pivot 25 fixed with respect to movement from right to left as shown in Figs. 1–5 so that projecting end 22 of member 16 may be forced between the rim 14 and bead 13 as to be described below.

The inner end 22 of the member 16 is wedge-shaped with the point curved slightly upwardly as shown in Figs. 1–5. On the channel member 16 is an elongated depressable finger 29 pivoted as at 31 on the flanges 21. Formed integrally thereof or attached thereto as by welding or the like is an arcuate actuator pin 32 extending through hole 32' in the member 16 and formed with an enlarged head 33. Across the top of the head 33 is a V-shaped groove 34. A leaf spring 35 is provided to retain the finger 29 in abutting relationship with the underside of the channel member 16. The leaf spring is mounted to the underside of the member 16 as by a screw 36 and nut 37. Preferably the flanges 21 at the outer end of the member 16 are cut away to form a more easily grasped handle 38, as shown in Fig. 1.

*Operation*

To loosen the bead of a tire from the rim of wheel in order to remove or replace the tire or remove or replace the tube, the tool is oriented with the rim in the position shown in Fig. 3 wherein the channel member 17 lies across the wheel with the notch 28 engaging the inner periphery of the rim flange 14'. The arm 16 is then positioned with its wedge shaped end 22 inserted at the outer periphery of the rim flange 14' between the flange and the tire as shown in Fig. 3. In this position the outer hooks 23 extend inwardly, resting on the flange 14' of the rim 14 as shown in Fig. 3.

While holding the member 17 rigidly as by the pressure of a foot or hand, the member 16 is pivoted about the pivot 25 by moving the member 16 from the position shown in Fig. 3 to the position shown in Fig. 4, as by pressing on the outer end thereof using member 16 as a lever. A compound linkage is supplied in this region with pivots 25, 19, and a large differential in moment arms is provided between the portion of the arm 16 from the pivot 19 to the end 22, and the pivot 19 to the handle 38, forcing the arcuate point 22 of the arm 16 under the rim flange between the flange and the bead as seen in Fig. 4. This provides a fixed contact between the bead and finger 29. In this position the hooks 23 slide over the rim flange until the notches 24 engage and hook onto the flange, replacing the gripping action of the now horizontal member 17 through notches 24. The member 17 can now be pivoted about the pivot 19 to a position substantially parallel to the member 16 shown in broken lines in Fig. 5 so that the projecting end 27 engages the groove 34 of the head 33 of the arcuate pin 32. Then, raising the member 17 about the pivot 19 in a forward direction as will separate the arms 16, 17, an arcuate force is applied to the head 33 of the pin 32, which rotates the finger 29 about its pivot 31, causing finger 29 to depress the bead 12, breaking the adhesion at that region as shown in Fig. 5, full lines. Once the adhesion is thus broken at this region of the periphery of the bead, the entire bead will drop off the rim into the enlarged portion 13a of the groove 13, or will do so with only a relatively slight push against the tire.

Accordingly, it will be seen that I have provided a relatively light simple tool which is very effective for removing a tire from the rim upon which it is mounted, and especially for breaking the usually difficult adhesion between the bead and the rim. My device provides an arrangement whereby a wedge-like finger can be inserted by a lever system between the rim and the tire. With this lever system thus holding the finger, the finger can be forced in between the bead and the rim flange itself, initiating a breaking of the bead. Then, this finger held in position can be forced down to completely break the bead of the tire away from the rim by means of separating the finger into two parts so that the two parts of the finger can push the bead of the tire away from the substantially horizontal portion of the rim between the flange and the extreme inner edge of the tire in contact with the substantially vertical portion of the rim, all as shown in Figs. 3, 4 and 5.

The specific embodiment given above is for the purpose of illustrating my invention and it will be understood that my invention includes other modifications within the scope of the following claim.

I claim:

In a device for removing an automobile tire from the rim of the wheel which breaks the bead between the tire and rim and separates the tire from the rim, the combination comprising a first lever arm having a wedge at one end thereof for inserting between the tire bead and the rim flange a pair of curved links pivoted one to each side of said first lever arm at a position spaced from the end of said wedge and adapted to extend over said rim, a second lever arm pivoted to the free ends of said links at a spaced point from one end thereof, said one end of said second lever arm being adapted to engage the outside of the rim flange to serve as an abutment while said first lever arm is pivoted to force the wedge between the tire bead and the inside of said rim flange, a pair of hooks pivotally connected to said first lever arm adjacent the wedge thereof, a tire depressing finger pivoted to the underside of said first lever arm at a distance from the end of said wedge greater than the pivotal connection of said links to said first lever arm and substantially conforming to the wedge shape of said first lever arm but separable therefrom by rotation about its pivotal connection to said first lever arm, pressure receiving means carried by said tire depressing fingr near the end of the wedge thereof extending upwardly therefrom above said first lever arm and adapted to be engaged by said one end of said second lever arm when said hooks are engaged over the edge of the rim flange, whereby said tire depressing finger is forced down to separate the tire bead from the rim flange.

References Cited in the file of this patent
UNITED STATES PATENTS

| | | |
|---|---|---|
| 2,293,467 | Kenworthy | Aug. 18, 1942 |
| 2,314,127 | Colley et al. | Mar. 16, 1943 |
| 2,319,155 | Passanante et al. | May 11, 1943 |
| 2,367,638 | Mc Culloch | Jan. 16, 1945 |
| 2,495,117 | Mc Collister | Jan. 17, 1950 |
| 2,563,987 | Colley | Aug. 14, 1951 |
| 2,606,602 | Manupello | Aug. 12, 1952 |